United States Patent [19]
Alperovich et al.

[11] Patent Number: 6,018,660
[45] Date of Patent: Jan. 25, 2000

[54] SYSTEM AND METHOD FOR INVOKING BARRING FEATURES IN A SATELLITE NETWORK

[75] Inventors: Vladimir Alperovich, Dallas; Eric Valentine, Plano, both of Tex.

[73] Assignee: Ericsson Inc., Research Triangle Park, N.C.

[21] Appl. No.: 09/031,785

[22] Filed: Feb. 27, 1998

[51] Int. Cl.[7] .................................................. H04Q 7/00
[52] U.S. Cl. ..................... 455/433; 455/12.1; 455/427; 455/435; 455/461
[58] Field of Search .................................. 455/427, 430, 455/432–433, 435, 445, 461, 12.1, 13.1, 507, 517, 524–525, 560–561

[56] References Cited

U.S. PATENT DOCUMENTS 5,778,304   7/1998   Grube et al. ............................ 455/422

FOREIGN PATENT DOCUMENTS 0 808 035 A2  11/1997  European Pat. Off. .
WO 95/20299   7/1995   WIPO .
WO 95/21509   8/1995   WIPO .
WO 97/46036  12/1997   WIPO .

OTHER PUBLICATIONS

PCT International Search Report dated Jun. 4, 1999.

*Primary Examiner*—Doris H. To
*Attorney, Agent, or Firm*—Jenkens & Gilchrist, P.C.

[57] ABSTRACT

A telecommunications system and method is disclosed for invoking barring features within a satellite network when calls to a subscriber within the satellite network are optimized. When a call is optimized for the satellite subscriber, the actual geographic location of the satellite subscriber is sent to the HLR and the new (optimal) MSC/VLR. This location can be sent as an MSC address, or other form. Therefore, when a barring feature is associated with the call, this MSC address is checked by the serving MSC or the HLR (in the case of barring of incoming calls when roaming outside of the home Public Land Mobile Network country). If the satellite subscriber's actual geographic location is within the barred area, the barring feature is invoked. Otherwise, the barring feature is not invoked.

22 Claims, 4 Drawing Sheets

SYSTEM AND METHOD FOR INVOKING BARRING FEATURES IN A SATELLITE NETWORK

BACKGROUND OF THE PRESENT INVENTION

Field of the Invention

The present invention relates generally to telecommunications systems and methods for call management within a satellite network, and specifically to properly invoking barring features when a call associated with a mobile terminal within the satellite network has been optimized.

BACKGROUND AND OBJECTS OF THE PRESENT INVENTION

Cellular telecommunications is one of the fastest growing and most demanding telecommunications applications ever. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system in use today, and described in more detail herein.

With reference now to FIG. 1 of the drawings, there is illustrated a GSM Public Land Mobile Network (PLMN), such as cellular network 10, which in turn is composed of a plurality of areas 12, each with a Mobile Services Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) 20 may move freely without having to send update location information to the MSC/VLR area 12 that controls the LA 18. Each Location Area 12 is divided into a number of cells 22. Mobile Station (MS) 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the geographical part of the cell 22 for which it is responsible. It should be understood that the BSC 23 may be connected to several base transceiver stations 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLIN Service Area or cellular network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If a MS 20 roams into a new MSC/VLR area 12, the VLR 16 connected to that MSC 14 will request data about that Mobile Station 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

It should be understood that the aforementioned system 10, illustrated in FIG. 1, is a terrestrially-based system. In addition to the terrestrially-based systems, there are a number of satellite systems, which work together with the terrestrially-based systems to provide cellular telecommunications to a wider network of subscribers. This is due to the fact that the high altitude of the satellite makes the satellite visible (from a radio perspective) from a wider area on the earth. The higher the satellite, the larger the area that the satellite can communicate with.

Within a satellite-based network 205, as shown in FIG. 2 of the drawings, a system of geostationary satellites 200 in orbit are used to provide communication between Mobile Stations (MS) 210 and a satellite-adapted Base Station System (SBSS) 220, which is connected to an integrated Mobile Switching Center/Visitor Location Register (MSC/VLR) 240. The MS 210 communicates via one of the satellites 200 using a radio air interface, for instance, based on the Time Division Multiple Access (TDMA) or Code Division Multiple Access (CDMA). The satellite 200 in turn communicates with one or more SBSSs 220, which consist of equipment for communicating with the satellites 200 and through the satellites 200 to the Mobile Stations 210. The antennae and satellite tracking part of the system is the Radio Frequency Terminal (RFT) subsystem 230, which also provides for the connection of the communication path to the satellite 200.

In such satellite networks 205 using geostationary satellites 200, the coverage area for a satellite 200 can be (and usually is) very large. This area can be served by a number of MSC/VLRs 240 which are connected to Public Switched Telephone Networks (PSTNs) (wireline networks), PLMNs (cellular networks) and each other. The terrestrial interconnections (trunk circuits) to these MSC/VLRs 240 are expensive to install and maintain, especially in comparison to handling the traffic over the satellite 200. Since the distances within the area served by the satellite(s) 200 are typically very large, the costs for these circuits can be enormous. In particular, the costs can be considerable if the circuits must cross remote areas or oceans.

Therefore, calls within a geostationary satellite network can be optimized so that a subscriber is reallocated to the MSC/VLR which is the most optimal for a given call, for example, the closest MSC/VLR to the PSTN of the called party. The optimal MSC/VLR can be located in any country within the geosatellite network. However, as a result of the optimization of calls within the satellite network, a number of barring features, such as barring of international calls (both incoming and outgoing) when the satellite subscriber is within a certain geographical area, cannot be correctly implemented within the geosatellite system because the actual location of the satellite subscriber is not known.

It is therefore an object of the invention to allow implementation of barring features within a satellite network when calls to subscribers within the satellite network are optimized.

SUMMARY OF THE INVENTION

The present invention is directed to telecommunications systems and methods for invoking barring features within a satellite network when calls to or from a subscriber within the satellite network are optimized. When a call is optimized for the satellite subscriber, the actual geographic location of the satellite subscriber is sent to the HLR and the new (optimal) MSC/VLR. This location can be sent as an MSC address, or other form. Therefore, when a barring feature is associated with the call, this MSC address is checked by the serving MSC or the HLR (in the case of barring of incoming international calls). If the satellite subscriber's actual geographic location is within the area prescribed to the barring feature, the barring feature is invoked. Otherwise, the barring feature is not invoked.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
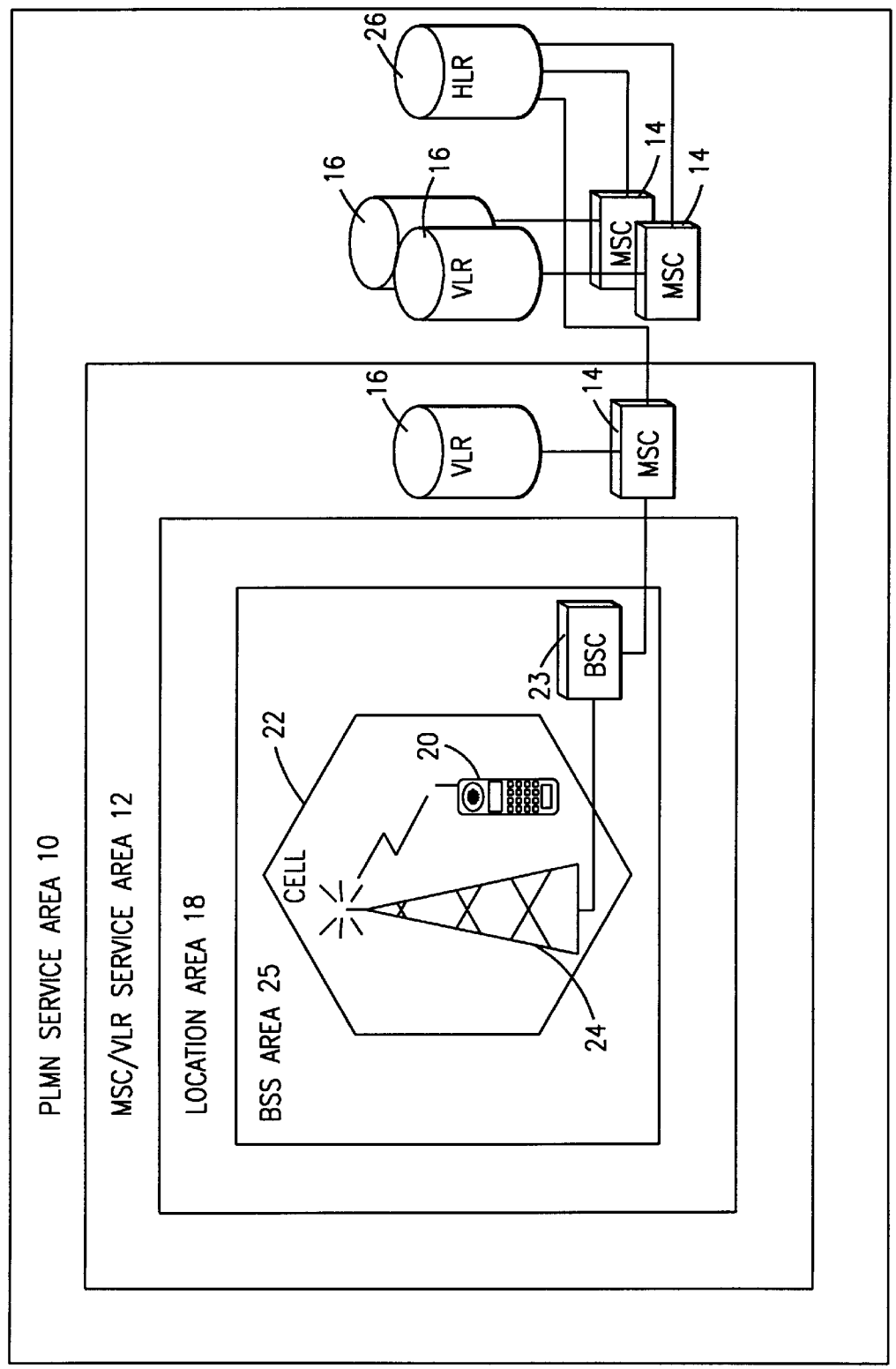
FIG. 1 is a block diagram of a conventional terrestrially-based wireless telecommunications system.
Figure 2:
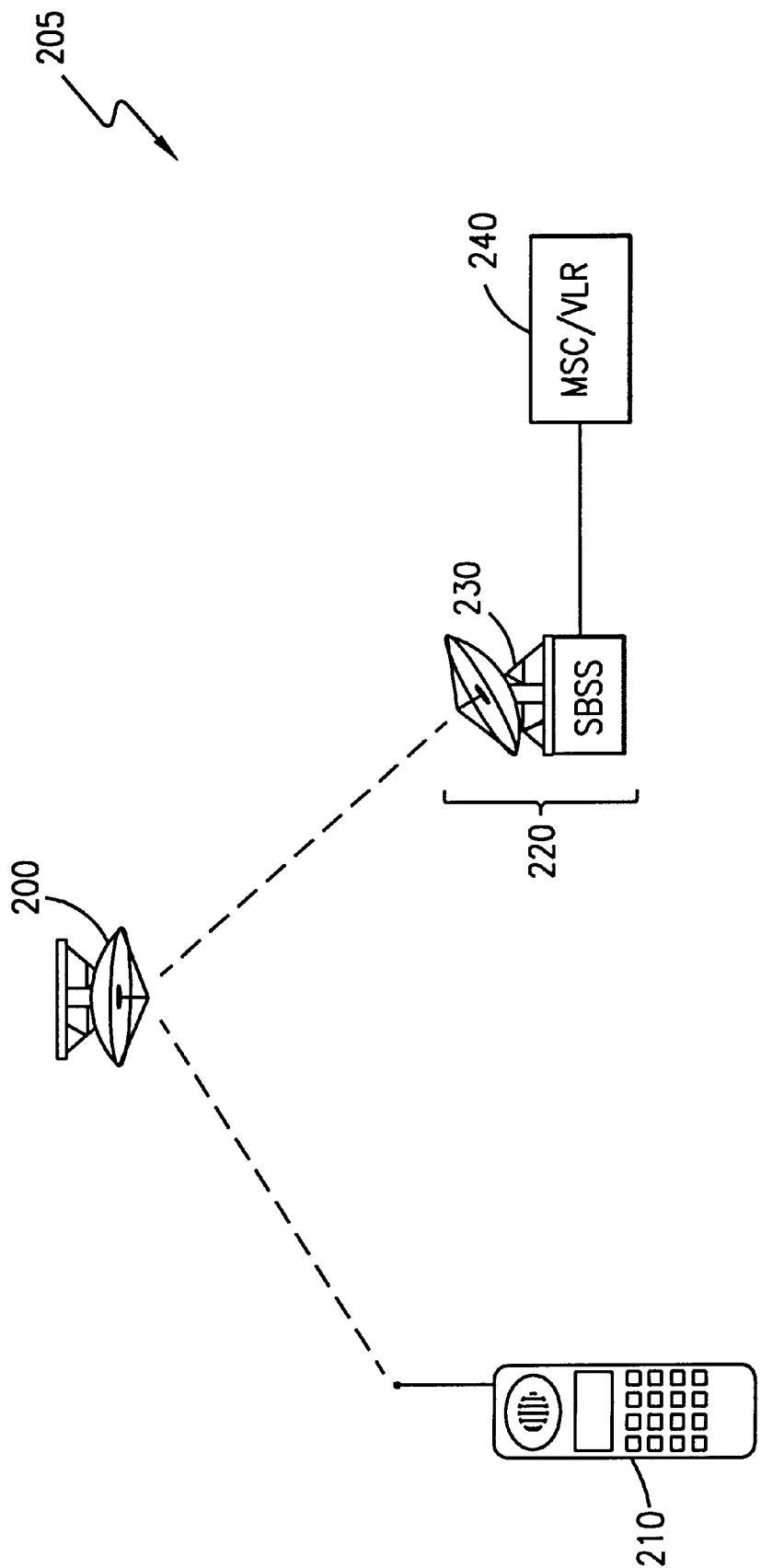
FIG. 2 is a block diagram illustrating aspects of a sample satellite-based network.
Figure 3:
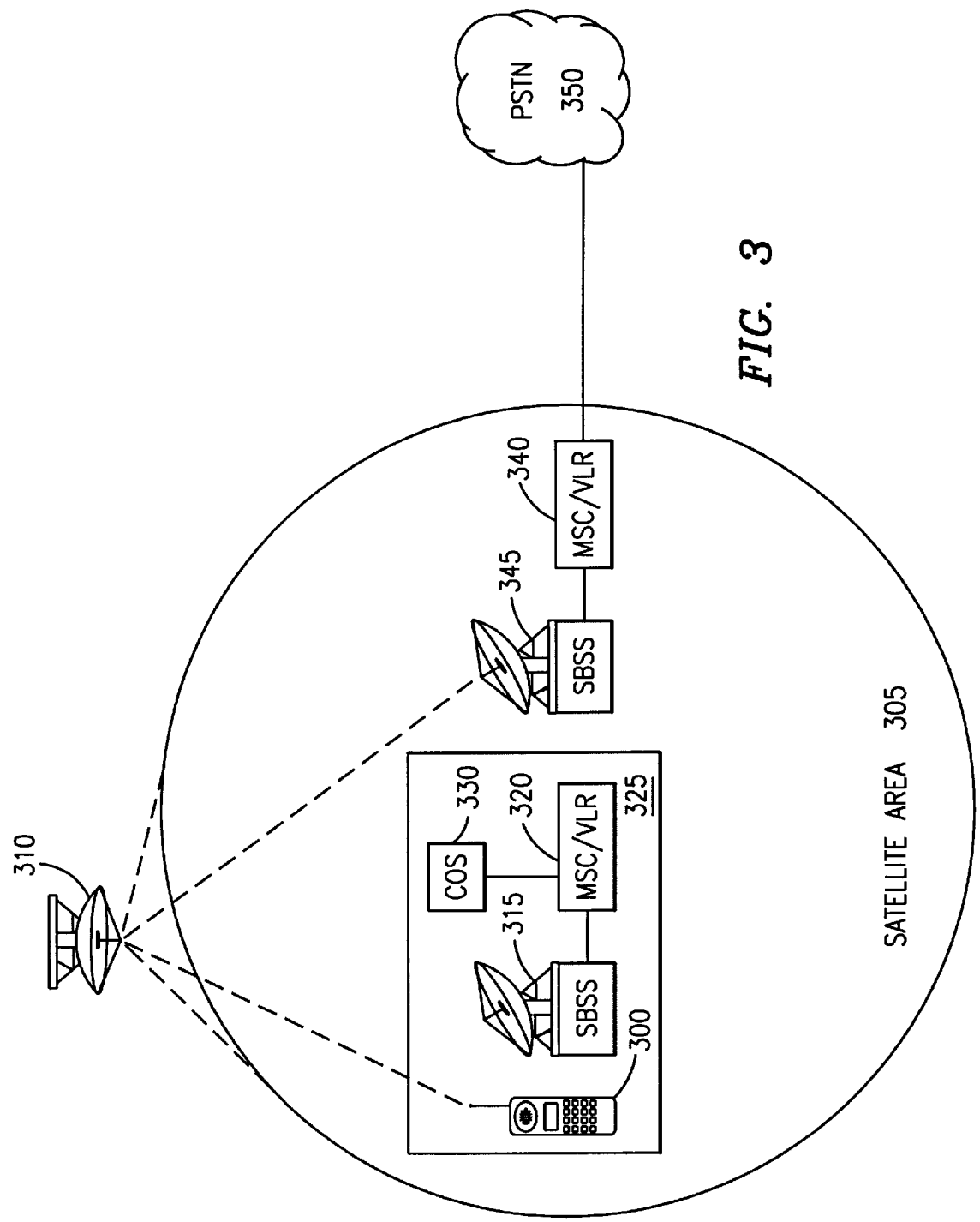
FIG. 3 is a block diagram illustrating call optimization for a mobile originated call to a subscriber within the Public Switched Telephone Network.

With reference now to FIG. 3 of the drawings, one example of call optimization within a satellite network is the optimization of a call from a mobile subscriber to a subscriber within the Public Switched Telephone Network (PSTN) 350 (wireline network). This can be accomplished by moving the mobile subscriber's registration to an "optimum" MSC/VLR 340 for that link. When a Mobile Station (MS) 300 within an area 305 visible to a satellite 310 initiates a call to a subscriber within the Public Switched Telephone Network (PSTN) 350, a Mobile Switching Center/Visitor Location Register (MSC/VLR) 320, serving the area 325 that the MS 300 is in, analyzes the Called Party Number (CPN) and determines that the CPN is not a number registered within the serving MSC/VLR 320. The serving MSC/VLR 320 then sends the CPN, using, for example, an Unstructured Supplementary Services Data (USSD) string, to a Call Optimization Server (COS) 330 or optimization node, which can be co-located with the serving MSC/VLR 320. Alternatively, it should be noted that the COS 330 could instead be co-located with a Home Location Register (HLR) (shown in FIG. 1) or an external node, such as a node within the Intelligent Network. The protocol to the external node could be based on an Intelligent Network (IN), Mobile Application Part (MAP) or other protocol, as is understood in the art.

The COS 330 then performs a pre-analysis on the CPN to determine that the CPN belongs to the PSTN 350. Thereafter, the COS 330 determines the optimum MSC/VLR 340, e.g., the MSC/VLR 340 within the area 305 visible to the satellite 310 that has the closest connection to the PSTN 350 or the least-expensive link to the PSTN 350, and returns the address for this optimum MSC/VLR 340 to the MS 300 via the satellite 310 and the serving MSC/VLR 320 and satellite-adapted Base Station System (SBSS) 315. The MS 300 then registers with the indicated MSC/VLR 340, and sends a SETUP message to the new MSC/VLR 340 via the satellite 310 and the new SBSS 345, as is understood in the art.

The call can then be completed normally using minimal terrestrial circuits and existing satellite resources. This call optimization process can also be utilized for calls between two MSs within the satellite network and for calls from the PSTN to a satellite MS subscriber.

However, when such call optimization is performed, barring features associated with the call may not be implemented correctly because the location of the MS is now considered to be the location of the new (optimal) MSC/VLR where the MS is registered.

Figure 4:
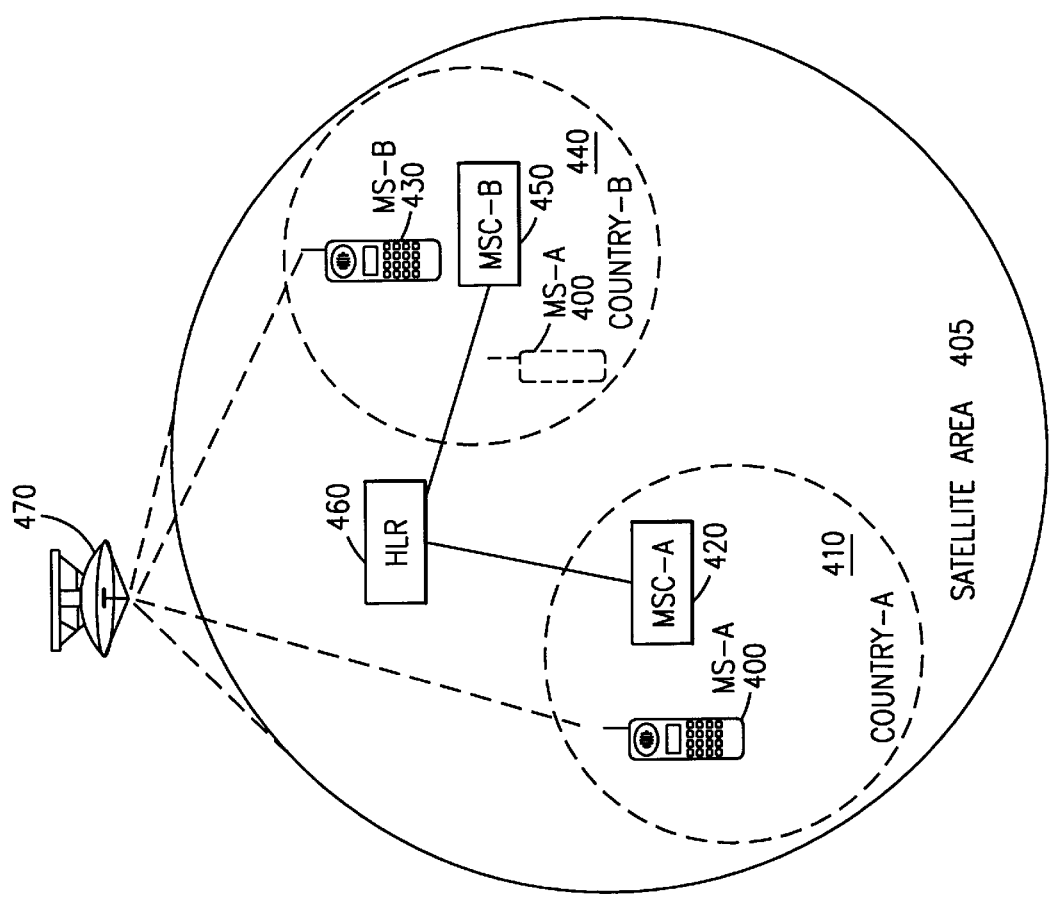
FIG. 4 illustrates the determination of the actual geographic location of a mobile terminal within a satellite network when a call to or from the mobile terminal has been optimized.

For example, as indicated in FIG. 4 of the drawings, if a subscriber MS-A 400 located in Country A 410 and registered in MSC-A 420 makes a call to subscriber MS-B 430 in Country B 440, subscriber MS-A 400 is re-registered in MSC-B 450 in Country B 440 via satellite 470. If Country B 440 has a barring feature which bars all outgoing calls other than calls to subscriber MS-A's home Country A 410 or bars incoming calls from another country except from subscriber MS-A's home Country A 410, when subscriber MS-A 400 receives a call from a subscriber (not shown) in another country or places a call to a subscriber in another country while connected to subscriber MS-B 430 and registered in MSC-B 450, the incoming or outgoing call will be barred, even though subscriber MS-A 400 is not actually located in Country B 440. Similarly, if subscriber MS-A 400 has indicated to the network provider that while roaming, no incoming or outgoing calls to a country other than subscriber MS-A's home Country A 410 are to be allowed, when subscriber MS-A 400 is re-registered in MSC-B 450, incoming and outgoing calls to another country are barred, even though subscriber MS-A 400 is not actually roaming.

Thus, in order to not interfere with subscriber MS-A's 400 features and to correctly activate the barring features for calls to and from MS-A 400 within the satellite network 405, the actual geographic location of subscriber MS-A 400 is sent to the Home Location Register (HLR) 460 and the new (optimal) MSC/VLR MSC-B 450. The location may be in the form of an MSC address or other form and can be sent, for example, in an Insert Subscriber Data message from the HLR 460 to the optimal MSC/VLR MSC-B 450. The location can be sent to the HLR 460 in a number of ways. For example, in one embodiment, the COS 330 can send the MSC address to the HLR 460 directly before instructing MS-A 400 to re-register with the optimal MSC/VLR MSC-B 450. Alternatively, as shown in FIG. 4, the COS 330 can instruct the home MSC/VLR MSC-A 410 to send the MSC address to the HLR 460 prior to MS-A 400 re-registering in MSC-B 450. Thereafter, when MSC-B 450 requests subscriber data from the HLR 460 regarding MS-A 400, the MSC address (of MSC-A 410) associated with the actual location of MS-A 400 is sent to the HLR 460 along with the MS-A 400 subscriber data.

Before the barring feature is invoked, this address is checked by the serving (optimal) MSC-B 450 or the HLR 460 (in the case of barring of incoming calls when roaming outside of the home Public Land Mobile Network country). If MS-A 400 is not within the area associated with the barring feature, the barring feature is not activated. Therefore, optimization of calls to or from subscriber MS-A 400 within the satellite network 405 can be performed without interfering with subscriber MS-A's 400 features.

As will be recognized by those skilled in the art, the innovative concepts described in the present application can be modified and varied over a wide range of applications. Accordingly, the scope of patented subject matter should not be limited to any of the specific exemplary teachings discussed.

What is claimed is:

1. A telecommunications system for invoking barring features within a satellite network, comprising:

an original mobile switching center within said satellite network, said original mobile switching center having an address associated therewith, said original mobile switching center serving an area containing a given one of a plurality of mobile terminals;

an optimal mobile switching center within said satellite network, said optimal mobile switching center being in communication with said given mobile terminal via a satellite, said given mobile terminal being registered in said optimal mobile switching center when a call associated with said given mobile terminal is optimized within said satellite network; and a home location register connected to said original mobile switching center and said optimal mobile switching center, said home location register storing said address and forwarding said address to said optimal mobile switching center when said given mobile terminal registers with said optimal mobile switching center, said barring features being invoked by said optimal mobile switching center pursuant to said address.

2. The telecommunications system of claim 1, wherein said original mobile switching center forwards said address to said home location register when said call is optimized.

3. The telecommunications system of claim 1, wherein said home location register forwards said address to said optimal mobile switching center in an Insert Subscriber Data message.

4. The telecommunications system of claim 1, wherein said call has a called party number associated therewith, said original mobile switching center sending said called party number to a call optimization node connected to said original mobile switching center, said call optimization node determining said optimal mobile switching center, said call optimization node sending instructions to said given mobile terminal via said satellite and said original mobile switching center to register with said optimal mobile switching center.

5. The telecommunications system of claim 4, wherein said call optimization node is co-located with said original mobile switching center.

6. The telecommunications system of claim 4, wherein said call optimization node is co-located with said home location register.

7. The telecommunications system of claim 4, wherein said original mobile switching center sends said called party number to said optimization node using an Unstructured Supplementary Service Data message.

8. The telecommunications system of claim 4, further comprising a satellite-adapted base station system connected to said original mobile switching center, said optimization node sending said instructions to said given mobile terminal via said satellite-adapted base station system.

9. The telecommunications system of claim 1, wherein said call is between said given mobile terminal and a called party, said optimal mobile switching center having the least expensive link to said called party.

10. The telecommunications system of claim 1, wherein said barring features are associated with the area served by said optimal mobile switching center, said barring features not being invoked when said given mobile terminal places an additional call while registered with said optimal mobile switching center.

11. The telecommunications system of claim 1, wherein said barring features are associated with the area served by said optimal mobile switching center, said barring features not being invoked when said given mobile terminal receives an additional call while registered with said optimal mobile switching center.

12. A method for invoking barring features within a satellite network, comprising the steps of:

optimizing a call associated with a given one of a plurality of mobile terminals within said satellite network;

upon said optimization, registering, by said given mobile terminal, with an optimal mobile switching center within said satellite network, said given mobile terminal being in communication with said optimal mobile switching center via a satellite;

receiving, by said optimal mobile switching center and a home location register connected to said optimal mobile switching center, an address associated with an original mobile switching center within said satellite network, said original mobile switching center serving an area containing said given mobile terminal; and invoking, by said optimal mobile switching center, said barring features pursuant to said address.

13. The method of claim 12, further comprising, before said step of receiving, the step of:

forwarding, by said original mobile switching center, said address to said home location register when said call is optimized.

14. The method of claim 12, wherein said step of receiving is performed by said home location register forwarding said address to said optimal mobile switching center in an Insert Subscriber Data message.

15. The method of claim 12, wherein said call has a called party number associated therewith, and further comprising, before said step of registering, the steps of:

sending, by said original mobile switching center, said called party number to a call optimization node connected to said original mobile switching center;

determining, by said call optimization node, said optimal mobile switching center; and sending, by said call optimization node, instructions to said given mobile terminal via said satellite and said original mobile switching center to register with said optimal mobile switching center.

16. The method of claim 15, wherein said call optimization node is co-located with said original mobile switching center.

17. The method of claim 15, wherein said call optimization node is co-located with said home location register.

18. The method of claim 15, wherein said step of sending said called party number to said optimization node is performed using an Unstructured Supplementary Service Data message.

19. The method of claim 15, wherein said step of sending said instructions is performed by said optimization sending said instructions to said given mobile terminal via a satellite-adapted base station system connected to said original mobile switching center.

20. The method of claim 12, wherein said call is between said given mobile terminal and a called party, said optimal mobile switching center having the least expensive link to said called party.

21. The method of claim 12, wherein said barring features are associated with the area served by said optimal mobile switching center, said barring features not being invoked when said given mobile terminal places an additional call while registered with said optimal mobile switching center.

22. The method of claim 12, wherein said barring features are associated with the area served by said optimal mobile switching center, said barring features not being invoked when said given mobile terminal receives an additional call while registered with said optimal mobile switching center.

* * * * *

UNITED STATES PATENT AND TRADEMARK OFFICE
CERTIFICATE OF CORRECTION

PATENT NO. : 6,018,660
DATED : January 25, 2000
INVENTOR(S) : Alperovich et al.

It is certified that error appears in the above-identified patent and that said Letters Patent is hereby corrected as shown below:

Column 1, line 54    Replace "PLIN"
    With --PLMN--

Signed and Sealed this

Tenth Day of April, 2001

Attest:

NICHOLAS P. GODICI

Attesting Officer    Acting Director of the United States Patent and Trademark Office